United States Patent [19]
Doddapaneni et al.

[11] Patent Number: 4,598,029
[45] Date of Patent: Jul. 1, 1986

[54] REVERSAL RESISTANT NON-AQUEOUS ELECTROCHEMICAL CELL

[75] Inventors: Narayan Doddapaneni, Glenside; David L. Chua, Bridgeport, both of Pa.

[73] Assignee: Honeywell Inc., Minneapolis, Minn.

[21] Appl. No.: 786,931

[22] Filed: Oct. 11, 1985

[51] Int. Cl.[4] .................... H01M 10/36; H01M 10/44
[52] U.S. Cl. ...................................... 429/50; 429/101
[58] Field of Search ................... 429/101, 57, 50, 60

[56] References Cited
U.S. PATENT DOCUMENTS

| 3,174,878 | 3/1965 | Peters | 429/60 |
| 3,558,356 | 1/1971 | Jost | 429/60 |
| 3,773,558 | 11/1973 | Charbonnier | 136/6 LN |
| 4,283,469 | 8/1981 | Goebel et al. | 429/196 |
| 4,352,867 | 10/1982 | Catanzarite | 429/101 |
| 4,383,012 | 5/1983 | Driscoll | 429/101 |
| 4,407,910 | 10/1983 | Catanzarite | 429/57 |

Primary Examiner—Donald L. Walton
Attorney, Agent, or Firm—Charles G. Mersereau

[57] ABSTRACT

Problems associated with voltage reversal hazards in high energy density non-aqueous electrochemical cells are prevented for all except extremely high discharge rates by the provision of a safety separator which is sufficiently porous to allow normal cell operation in the forward direction but which prevents voltage reversal in all but the most extreme cases. The separator may take the form of a thin sheet of ceramic material which need not contact either the anode or the cathode but which forms an ion-permeable mechanical barrier separating the electrodes while allowing normal cell operation.

13 Claims, 8 Drawing Figures 4.0-INCH DIAMETER Li/SOCl₂ CELLS WITH CATHODE-ANODE-CATHODE DESIGN AT -2°C.
(———) MANNING GLASS SEPARATOR   (---) CERAMIC SEPARATOR I

REVERSAL RESISTANT NON-AQUEOUS ELECTROCHEMICAL CELL

The U.S. Government has certain rights in this invention pursuant to a contract with the Department of the Navy.

BACKGROUND OF THE INVENTION

1. Field of the Invention

The present invention relates to the field of non-aqueous electrochemical cells and, more particularly, to a high energy density, non-aqueous electrochemical cell which safely withstands extensive cell voltage reversal.

2. Description of the Prior Art

Much work has been done in the field of high energy battery systems utilizing highly reactive anode materials such as alkali metals in combination with non-aqueous electrolytes. In these cells, the preferred alkali metal anode is lithium. The electrolyte normally includes a solute which is commonly a metal salt or complex metal salt of the metal anode material dissolved in a compatible non-aqueous solvent depolarizer. Examples of such salts include lithium tetrachloroaluminate and the solvents include those containing sulfur dioxide ($SO_2$), thionyl chloride ($SOCl_2$) and sulfuryl chloride ($SO_2Cl_2$). An inert cathode collector such as one made of compressed carbon black completes the cell couple.

While the present invention is applicable to all non-aqueous cells that utilize active metal anodes with relatively small ions such as lithium or potassium it is particularly suited to cells designed to be anode-limited. An anode-limited cell may be defined as an active metal, non-aqueous electrochemical cell which, when discharged under the designed rates, will be depleted of anode material at levels $\geq 90\%$ utilization when the cell reaches a voltage cut-off at $\geq 0.0$ volts.

A basic problem with the electrochemical cells of the type described, especially those cells utilizing sulfur dioxide, thionyl chloride or sulfuryl chloride in combination with an active metal such as lithium, has been the problem of safe storage and operation of the batteries. Applications of such cells, are usually ones in which the cells are packaged in battery configurations in which a plurality of such cells are connected in series. It is well known that the discharge of a plurality of cells in such battery configurations may result in the possibility of cell voltage reversals due to overdischarge of one or more of the cells. Under this condition prior art batteries tend to experience undesirable reactions even at ambient temperature. This leads to pressure build up within the cell which may cause the cell to burst or, in severe cases, undergo a powerful detonation. This, of course, is quite undesirable, especially if the batteries are to be operated in the proximity of persons who might be physically harmed by such a turn of events.

Thus, a definite need remains to provide such cells with a means for preventing or reducing the hazards associated with voltage reversals. In accordance with the present invention, it has been found that the use of a ceramic separator possessing certain properties prevents voltage reversals in anode-limited cells of the class described.

In the prior art, several species of ceramic separators have been employed. One is illustrated and described in U.S. Pat. No. 4,283,469 to Goebel, et al in which a thin film of porous ceramic material, which may be sprayed in the form of a slurry, is applied to the cathode collector electrode to form a composite cathode collector. The only requirement of this film is that it be nonconducting in itself and be porous to the electrolyte solution. The function of the ceramic film is to prevent unwanted reactions involving lithium at high temperatures. In U.S. Pat. No. 4,407,910 to Catanzarite, as in Goebel et al, ceramic separators are utilized for their chemical properties of preventing reactions between highly reactive anodes such as lithium and other system components such as thionyl chloride at elevated temperatures.

None of the prior art cells either address or solve the problem of voltage reversal, however. The known prior art cells which utilize ceramic in any form between the anode and the cathode do so specifically to prevent high temperature lithium reactions which, although a definite hazard in such cells, represent a hazard quite different from that of voltage reversal. Voltage reversal is associated with overdischarge of anode-limited cells in which the lithium has been depleted or exhausted. Reactions between the lithium and other solution species either cannot occur or are of no consequence under this condition.

SUMMARY OF THE INVENTION

By means of the present invention, problems associated with voltage reversal hazards in high energy density non-aqueous electrochemical cells are prevented for all except extremely high discharge rates by the provision of a safety separator which is sufficiently porous to allow normal cell operation in the forward direction but which prevents voltage reversal in all but the most extreme cases. The separator may take the form of a thin sheet of ceramic material which need not contact either the anode or the cathode but which forms an ion-permeable mechanical barrier separating the electrodes while allowing normal cell operation.

While it is contemplated that many such materials exist, one material which has been used in the preferred embodiment of the present invention consists of an alumina/silica based porous ceramic material, also containing other materials as described later herein.

In situations where the anode, normally lithium, has been depleted or virtually depleted by discharge or overdischarge of the cell, the separator material appears to operate in the manner of a shunt thereby preventing voltage reversals. The invention, of course, is applicable to signal cells or a plurality of cells combined into a series connected battery. The separator provides a distinct advantage over conventional porous separators even at normal, ambient operating temperatures.

DESCRIPTION OF THE PREFERRED EMBODIMENT

Figure 1:
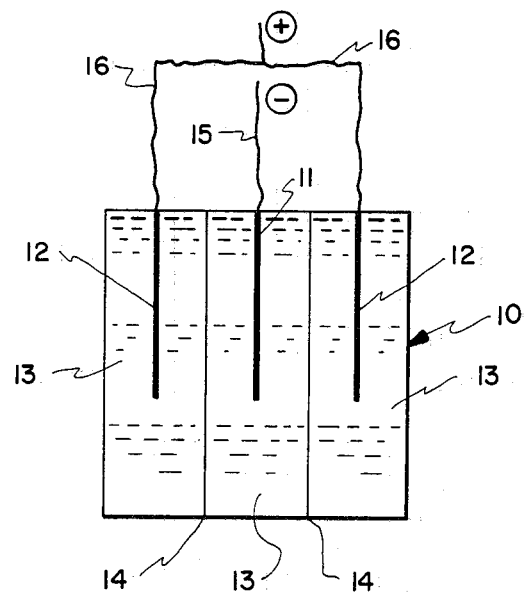
FIG. 1 illustrates a simplified cell using the separator in accordance with the invention.

FIG. 1 illustrates a cell utilizing the separator of the invention in its simplest form. It includes a sealed cell body 10 containing an anode 11, a cathode collector 12 and an electrolyte solution 13. The anode and cathode are separated physically from each other by the ion-permeable separator barrier of the invention 14. Electrical leads 15 and 16 are attached to the anode and cathode electrodes, respectively, through the sealed cell 10. Cells of this type are normally connected in series with other such cells to form multi-cell batteries in a well known manner which need not be illustrated. The barrier 14 need not be of any particular thickness so long as sufficient ion transport exists to maintain normal peak cell operation during discharging. Also, the separator barrier 14 need not be particularly close to or contact either electrode.

As has been stated previously, it has been found that a barrier 14 fabricated of ceramic "paper" comprising an alumina ($Al_2O_3$) based ceramics which also contain amounts of silica ($SiO_2$) together with sulfate and/or sulfite compounds have been found to work very successfully in inhibiting voltage reversals of the cells in a discharged or overdischarged condition. While no particular thickness is required, ceramic papers having a thickness from approximately 0.005 inches to 0.030 inches (depending on composition) have worked quite successfully in these cells. One such material is a ceramic separator manufactured by Cotronic Corporation of Brooklyn, N.Y. That separator is a type 300 ceramic paper having a composition approximately as follows: 66% $Al_2O_3$, 29% $SiO_2$, 4.5% food starch, 0.25% acrylic polymer and 0.25% neoprene synthetic rubber. Another example of a ceramic material which has been used successfully is Lytherm premium paper grade 1530 obtained from Lydall Inc., Rochester, N.H., which has a composition approximately as follows: 52% $SiO_2$, 47% $Al_2O_3$, 0.4% $Fe_2O_3$, 0.4% $TiO_2$ and 0.2% $Na_2O$. The Cotronic paper separator has a nominal thickness of 0.015 inches and the Lydall product had a nominal thickness of 0.020 inches.

Figure 2:
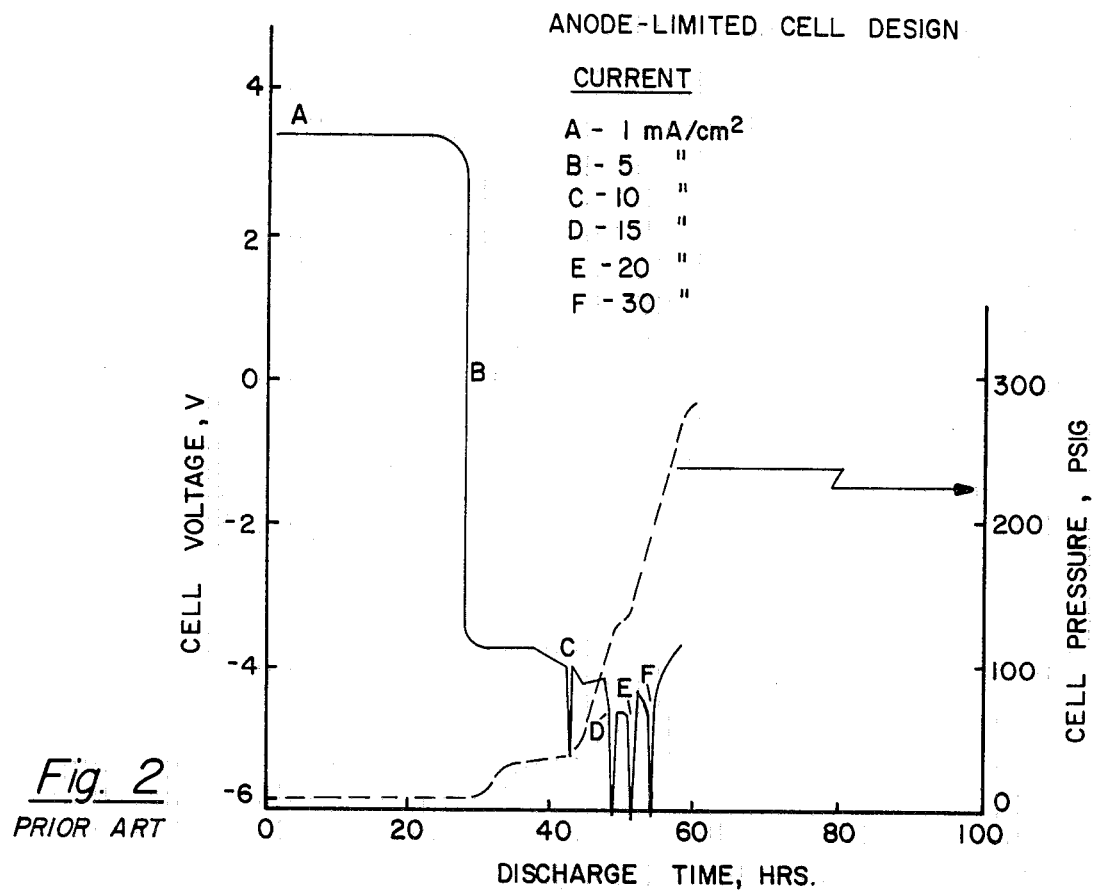
FIG. 2 is a graphical representation of the discharge and reversal of a prior art anode-limited cell using a porous glass matt separator.

FIG. 2 is a graphical representation of the discharge and reversal of a prior art cell utilizing a 0.005 inch thick glass matt such as one available from Manning of Troy, N.Y. and known as Manninglass-1200. It should be noted that as the cell current is increased to 5 mA/cm$^2$ after about 25 hours, a dramatic voltage reversal occurs indicating cell failure. As the current is increased highly negative erratic voltages are seen in curves C, E and F. It should also be noted that at a discharge rate above 15 mA/cm$^2$ the cell pressure rises dramatically indicating that undesirable reactions are occurring within the cell due to the voltage reversal. This occurs at approximately the 50 hour discharge time mark and represents a dangerous condition.

Figure 3:
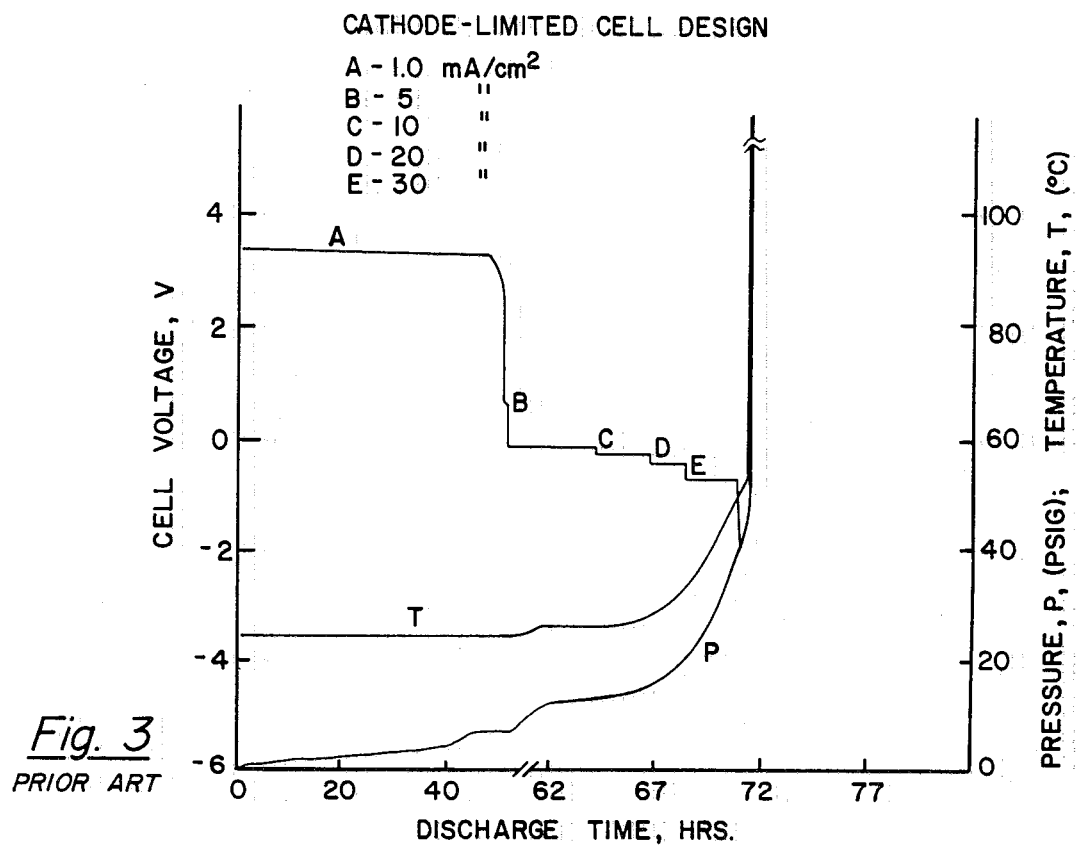
FIG. 3 is similar to FIG. 2 utilizing prior art cathode-limited cell using a porous glass matt separator.

FIG. 3, like FIG. 2, depicts the discharge and overdischarge characteristics of a prior art cell. The cell of FIG. 3 is a cathode-limited cell also utilizing a glass matt separator. In contrast to the characteristics observed in FIG. 2, the cathode-limited cell withstands currents as high as 30 mA/cm$^2$ up to approximately the 70 hour mark with very little voltage reversal. However, at this high discharge rate, as can be seen in the vertical line of FIG. 3, both temperature and pressure run away at this point and the cell detonates.

Figure 4:
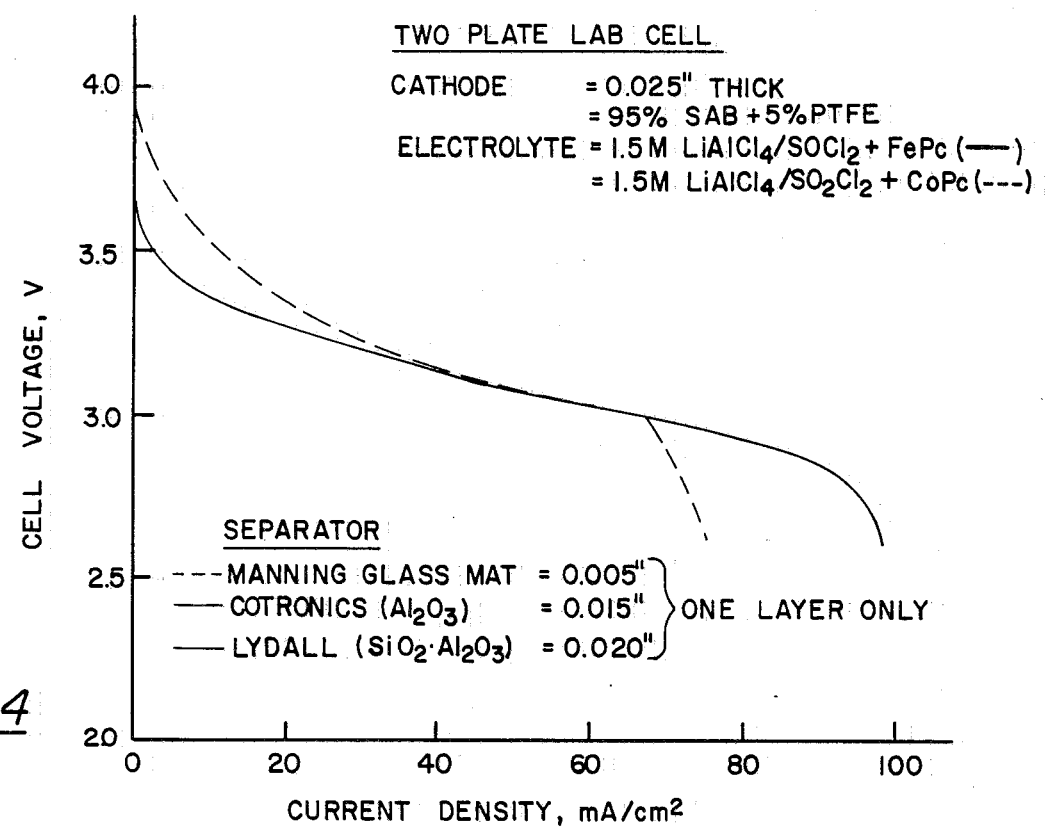
FIG. 4 is a graphical representation of cell voltage versus current density which compares the polarization characteristics of two ceramic separators of the invention with a conventional glass matt separator.

In FIG. 4, the polarization characteristics of additional lithium, anode-limited, non-aqueous cells utilizing three types of separators are compared. Identical discharge characteristics are observed for the two ceramic separators of the invention and substantially the same discharge behavior is achieved with all three separators. Under a constant current load, the separators depict no difference in the achieved specific cathode capacity. This illustrates that the separators of the present invention do not reduce the efficiency of the desired operation of the cell in any manner.

Figure 5:
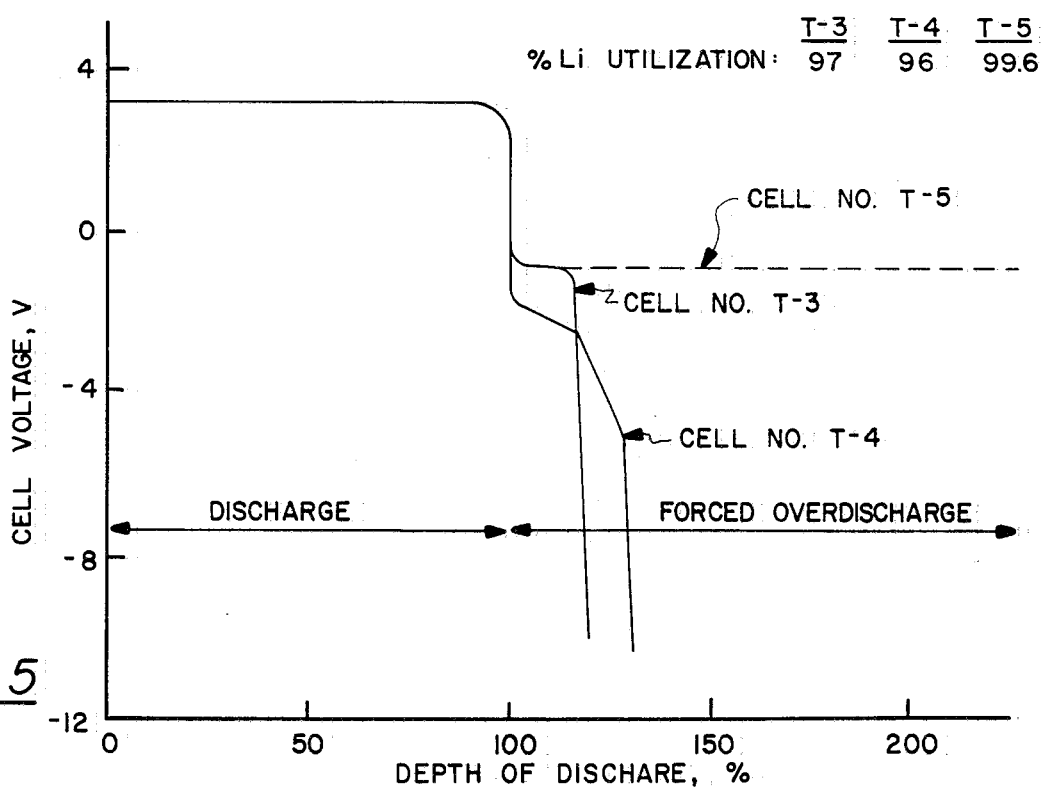
FIG. 5 is a graphical representation comparing the effects of forced overdischarge on cells utilizing conventional glass separators and the ceramic separator of the invention.

FIG. 5 illustrates several additional cells and their reaction to forced overdischarge currents. Cells T-3 and T-4 utilize conventional glass separators and cell T-5 utilizes a ceramic separator in accordance with the present invention. The superiority of the cell utilizing the separator of the present invention is readily seen. Cell T-3 fails at about 25% depth of overdischarge and cell T-4, at about 35%.

Figure 6:
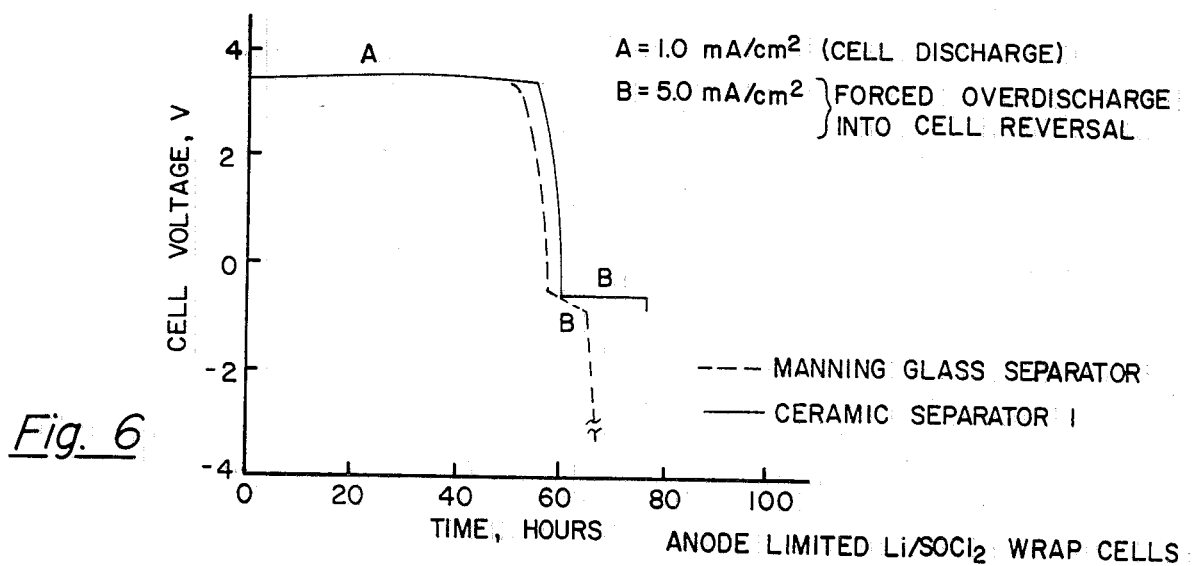
FIGS. 6, 7 and 8 are additional graphical representations comparing the discharge and forced overdischarge of a cell using a conventional separator with a cell utilizing the separator of the present invention forced into an overdischarge condition.
Figure 7:
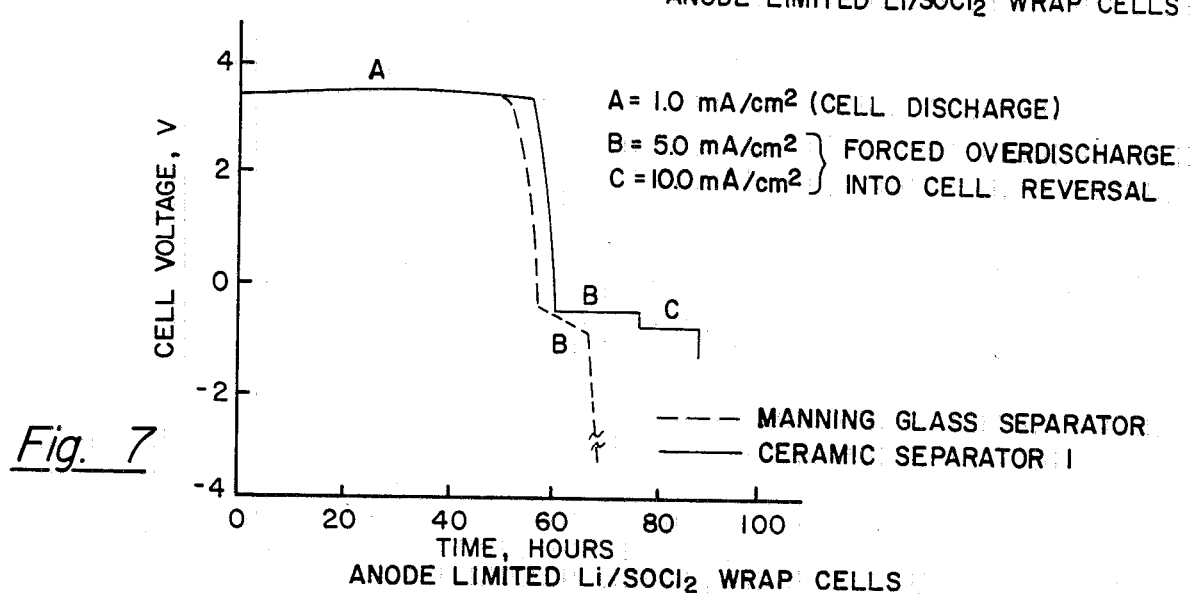
Figure 8:
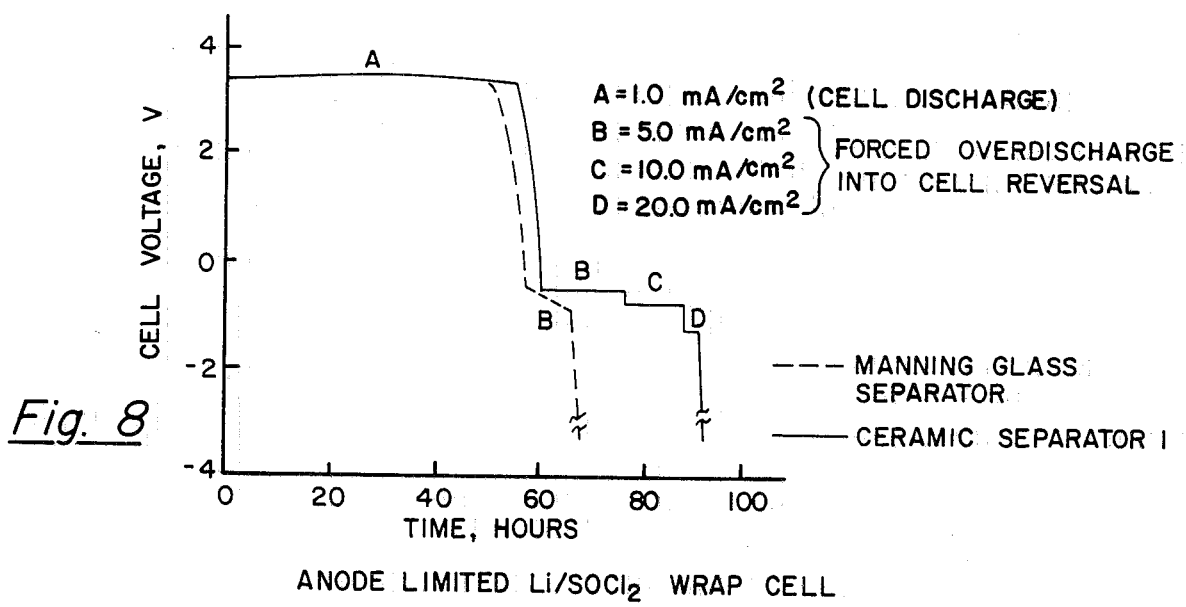

FIGS. 6-8 also depict the dramatic effect of the difference in separators during forced overdischarge conditions. It should further be noted that the reversal occurring at the end of curve D of FIG. 8 occurred when a weld connecting a lead wire failed in the cell being tested and is not indicative of cell performance.

It can be seen from the figure that ceramic separators can prevent cells from undergoing severe reversal voltage drops which can lead to hazardous conditions. This appears to be true within the foreseeable range of amounts of overdischarge which would likely occur in any operating cell environment. In addition, utilizing the ceramic separators of the invention showed no deletrious effects on the rate and power capabilities of the cells. In fact, for test cells made in both the flat and wrap configurations, post mortem studies indicate that no anode grid corrosion was present, nor were there any lithium deposits present on either the anode grid or the separator. Similar cells made with glass matt separators displayed badly corroded anode grids, and a brownish-black material of unknown composition was observed in the separator.

The embodiments of the invention in which an exclusive property or right is claimed are defined as follows:

1. A method of preventing voltage reversals in an anode-limited, non-aqueous electrochemical cell comprising an active metal anode, an inert cathode collector and an electrolyte comprising a solute dissolved in a compatible non-aqueous solvent depolarizer selected from the group consisting of sulfur dioxide, oxyhalides, and thiohalides, comprising the step of placing a ceramic material between said anode and said cathode providing a physical separator therebetween, wherein said ceramic material consists primarily of alumina ($Al_2O_3$) and silica ($siO_2$).

2. The method of claim 1 wherein said separator is in the form of a sheet having a thickness of between 0.005 inches and 0.03 inches.

3. The method of claim 1 wherein said anode comprises lithium.

4. The method of claim 1 wherein said anode comprises lithium and wherein said cell contains a liquid oxyhalide.

5. The method of claim 4 wherein said oxyhalide is thionyl chloride.

6. The method of claim 5 wherein said inert cathode collector consists essentially of carbon black.

7. In an anode-limited, non-aqueous electrochemical cell having an active metal anode, an inert cathode collector, a separator member disposed between said anode and said cathode and an electrolyte consisting of a solute dissolved in a compatible non-aqueous solvent depolarizer, said solvent depolarizer consisting essentially of a compound selected from the group consisting of sulfur dioxide, oxyhalides and thiohalides, the improvement wherein: said separator member is a ceramic separator said ceramic separator member further being one which allows normal cell operation in the forward direction but prevents voltage reversals in the cell.

8. The cell of claim 7 wherein said ceramic separator material consists primarily of alumina and silica.

9. The cell of claim 8 wherein said separator is in the form of a sheet having a thickness of between 0.005 inches and 0.03 inches.

10. The cell of claim 8 wherein said anode comprises lithium.

11. The cell of claim 8 wherein said anode comprises lithium and wherein said cell contains a liquid oxyhalide.

12. The cell of claim 8 wherein said oxyhalide is thionyl chloride.

13. The cell of claim 8 wherein said inert cathode collector consists essentially of carbon black.

* * * * *